Oct. 26, 1954     E. B. DOOLIN     2,692,630
HOGSKIN CUTTING DIE
Filed Jan. 8, 1951
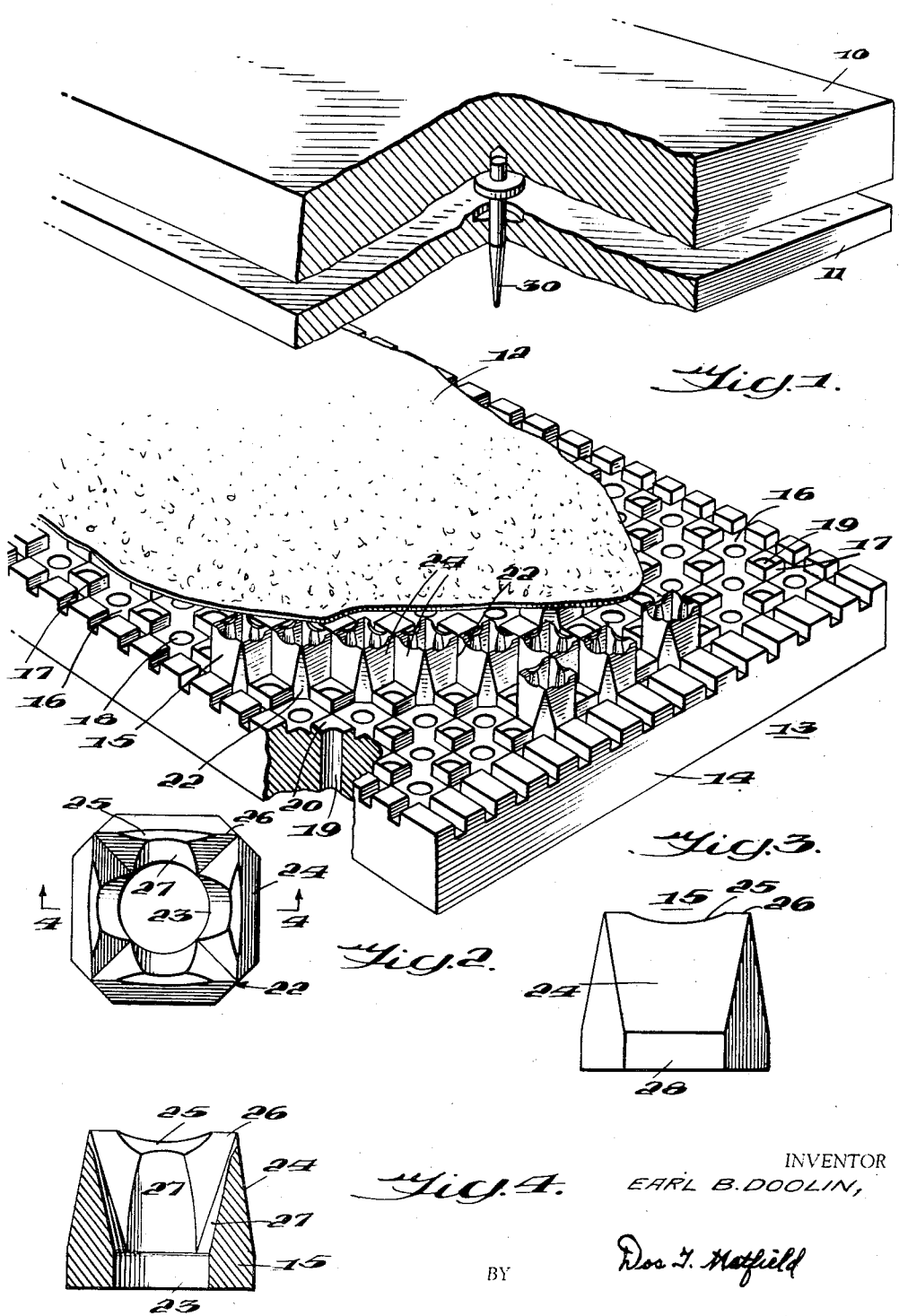
INVENTOR
EARL B. DOOLIN,
BY
ATTORNEY Patented Oct. 26, 1954

2,692,630

UNITED STATES PATENT OFFICE 2,692,630

HOGSKIN CUTTING DIE

Earl B. Doolin, Dallas, Tex., assignor to The Frito Company, Dallas, Tex., a corporation of Texas Application January 8, 1951, Serial No. 204,979

14 Claims. (Cl. 146—162)

The present invention relates to apparatus for cutting and punching flexible sheet material and more particularly to a novel form of cutting die unit together with a novel die block and assembly of unit cutting dies for cutting flexible sheet material into a plurality of predetermined polygonal shapes and sizes.

A popular form of food product has been manufactured from hogskins which have been rendered for a certain period of time and thereafter placed in hot oil wherein the cells of the hogskins disintegrate causing an explosion and producing a puffed meat product. Of course it is desirable to cut the hogskins into a plurality of small predetermined shapes and sizes before the cooking process and, prior to this invention, the hogskins have been laboriously cut by hand with a rotary saw.

It is a principal object of this invention to provide a novel form of cutting die unit and die block assembly of cutting die units for cutting a hogskin or the like into a plurality of predetermined small polygonal shapes and sizes with a single operation, thus facilitating the production of cut and trimmed hogskins for subsequent cooking operations.

An important object of the invention is to provide a novel form of cutting die unit having specially shaped cutting edges and cooperating side wall supporting surfaces to facilitate the cutting or punching of a flexible sheet material such as a hogskin or the like.

Another important object of the invention is to provide a novel form of cutting die having cutting edges arranged in a square unit together with specially shaped supporting walls to cooperate with a novel form of cutting die unit supporting base or die block member so as to form a cutting die unit assembly formed with the die units in staggered alternate rank and file of checkerboard arrangement with the corners of their cutting edges in adjoining or abutting relation so as to produce a complete die assembly for cutting large flexible sheet materials into a plurality of small square sections without any trimmings between the adjoining cut squares, the spaces between the staggered cutting die units together with the cutting edges of the unit, functioning to cut additional small square sections.

Another object of the invention is to provide a cutting die unit adapted to cut or punch a sheet of flexible material with the cut material passing through the cutting unit and having cutting edges arranged in a square to form a square cut of material.

Yet another object of the invention is to provide a novel form of cutting die unit for cutting flexible sheet material into square sections with the cut sections passing through the cutting unit to a suitable receiver, the die unit being specially shaped to provide a supporting base portion for the cutting edges and correspondingly shaped to facilitate the passage of the square cut sections of material through the supporting base portion of the cutting die unit.

The cutting die units and the die block assembly of cutting units of this invention are adapted for use with a hydraulic press or the like, the die assembly being mounted on the lower bed of the press with a pressure plate affixed to the upper press member for forcing flexible sheet materials such as hogskins upon the cutting edges of the die units. The press is preferably adjusted so that the cutting edges of the die units will not contact the pressure plate and a sufficient thickness or a plurality of layers of hogskins are maintained in the press to assure the cutting of the lowermost sheets and the forcing of the cut material through the die assembly to the receiving container.

Still another object of this invention is to provide a novel form of cutting die supporting unit or die block member for mounting a plurality of cutting die units in staggered alternate rank and file of checkerboard arrangement, the portions of the die block member between and beneath the alternate cutting die units being shaped and bored to permit the passage of cut material through the die block member to a container or receiver positioned therebelow.

Further objects and advantages of the invention will be apparent with reference to the following specification and drawing in which:

Fig. 1 is a fragmentary perspective view partially cut away to show the cutting die units, the cutting die supporting base or die block member and the upper pressure plate with a hogskin in position to be cut, the entire assembly being adapted to be mounted in conventional manner in a hydraulic press (not shown);

Fig. 2 is a top plan view of the cutting die unit of the invention;

Fig. 3 is a side elevation of the cutting die unit; and,

Fig. 4 is a vertical sectional view taken on line 4—4 of Fig. 2.

Referring to Fig. 1 of the drawing, numeral 10 indicates the upper press plate of a hydraulic or other conventional type of press (not shown) to which is secured in conventional fashion a stripper plate 11, the lower surface of which, when the press is closed, being adapted to contact a sheet of flexible material, such as the hogskin 12, and force it upon the lower cutting die assembly generally shown at 13. The cutting die assembly 13 is formed of a die block or cutting die unit supporting member 14 to the upper surface of which are mounted a plurality of cutting die units 15. The upper surface of the supporting member or die block 14 is machined to provide a plurality of nests 16 which are alternately spaced in staggered rank and file relation together with similarly placed and internested raised block portions 17, both of which are bored at 18 and 19 respectively to permit the passage of cut hogskin therethrough. It should be noted that the upper surfaces of the raised block portions 17 are bevelled inwardly as indicated by numeral 20 towards the bore hole 19 to facilitate the forced entry of the square cut hogskin into the bores, which are in substantial alignment with the cutting axis of the die units.

The nests 16 provide mounting spaces for the plurality of cutting die units 15 as should be readily apparent. The cutting die units 15 may be provided with four cutting edges at their upper ends arranged in the form of a square to enable the production of square cut sections from the hogskin or other flexible sheet material to be cut. It will be noted that each corner of the die unit is provided with a vertically extending side wall and edge 22, tapering upwardly to a point, adapted to abut the corresponding vertical side wall and edge 22 of the adjacent cutting die unit when assembled in the die block 14. Thus continuously abutting square shaped cutting edges are provided for cutting the hogskin or other flexible sheet material into square cut sections to be passed through the interior, inwardly tapered, bore 23 of the cutting die units 15 or the spaces afforded between the adjoining exterior downwardly and outwardly tapered wall surfaces 24 of the die units 15 to the bore holes 18 and 19 of the die block 14. It should be noted that the bores 23 of the die units 15 and the bores 19 of the raised block units 17 are in substantial alignment with the cutting axis of the die units. With such an arrangement of cutting die units 15 and die block 14 assembled in accordance with this invention, it should be apparent that the flexible sheet material such as the hogskin 12 can be cut into a plurality of small square cut sections with absolutely no trimmings or rind between the square cut sections.

With particular reference to Figs. 2 and 4 of the drawing, it will be noted that the cutting edges of the die unit are bevelled and hollow ground as shown at 25 to form an arcuately depressed cutting edges between the corners so that the corner cutting edges 26 are raised with respect thereto to provide a somewhat pointed cutting or punching surface to first penetrate the sheet to be cut, thus facilitating the cutting operation with less cutting pressure. It will further be noted that the tapered interior walls of the cutting die are bevelled and hollow ground such as shown at 27 to form the inwardly tapering interior wall surfaces from the square cut arrangement and shape at the cutting edges to the circular form of interior bore 23, thus facilitating the deformation of the square cut sections of material in their passage through the cutting die units. The base portion of the cutting die units 15 is enlarged to provide the necessary strength to the cutting unit and the side walls are shaped at 28 to abut the upstanding side walls of the raised block portions 17 of the die block 14, with the edge and side walls or corners 22 of the cutting units abutting each other as previously described.

The upper press plate 10 may be provided with a plurality of sharp pointed pins such as shown at 30 which are adapted to depend therefrom through the stripper plate 11 and engage the flexible material to be cut to prevent it from sliding from between the stripper plate and cutting die assembly. Such pin members are particularly desirable when a plurality of layers of hogskins such as the one shown at 12 are simultaneously pressed down upon the cutting die assembly.

While the invention has been particularly described in connection with apparatus for cutting hogskins into a plurality of square cut sections, it should be understood that certain features of the invention may be readily applied to apparatus for cutting other polygonal shapes of flexible material.

I claim:

1. A cutting die assembly for cutting flexible sheet material comprising a supporting die block member, means upstanding from said member for detachably mounting a plurality of individual cutting die units on said member, each of said individual units having upper cutting edges arranged in polygonal shape, said die units being mounted in rows on said member with spaces between adjacent die units of a row, the units of adjacent rows being offset relative to each other, and the corners of the cutting edges of units in one row in substantially abutting relation with the corners of the cutting edges of the units of the adjacent row.

2. A cutting die assembly for cutting flexible sheet material comprising a supporting die block member, means upstanding from said member for detachably mounting a plurality of individual cutting die units on said member, each of said individual units having upper cutting edges arranged in square shape, said die units being mounted on said member with the corners of their cutting edges in substantially abutting relation and with the units in alternate staggered rank and file relation to each other.

3. A cutting die assembly for cutting flexible sheet material comprising a supporting die block member, said member having means to detachably mount a plurality of individual cutting die units, each of said individual units having upper cutting edges arranged in polygonal shape, said die units being mounted in rows on said member with spaces between adjacent die units of a row, the units of adjacent rows being offset relative to each other, and the corners of the cutting edges of units in one row in substantially abutting relation with the corners of the cutting edges of the units of the adjacent row, each of said units having a bore in substantial alignment with its cutting axis to permit passage of cut material therethrough, said member having a plurality of bores, one each in respective substantial alignment with the bore of each of said units to permit passage of cut material therethrough.

4. A cutting die assembly for cutting flexible sheet material comprising a supporting die block member, said member having means to detachably mount a plurality of individual cutting die units, each of said individual units having upper cutting edges arranged in polygonal shape, said die units being mounted on said member with the corners of their cutting edges in substantially abutting relation and with the units in alternate staggered rank and file relation to each other, each of said units having a bore in substantial alignment with its cutting axis to permit passage of cut material therethrough, said member having a plurality of bores, one each in respective substantial alignment with the bore of each of said units to permit passage of cut material therethrough, said member between the mounted cutting units having a bore in substantial alignment with the cutting axes of the adjoining cutting units to permit passage of cut material therethrough.

5. A cutting die assembly for cutting flexible sheet material comprising a supporting die block member, said member having means to detachably mount a plurality of individual cutting die units, each of said individual units having upper cutting edges arranged in square shape, said die units being mounted on said member with the corners of their cutting edges in substantially abutting relation and with the units in alternate staggered rank and file relation to each other, each of said units having a bore in substantial alignment with its cutting axis to permit passage of cut material therethrough, said member having a plurality of bores, one each in respective substantial alignment with the bore of each of said units to permit passage of cut material therethrough.

6. A cutting die assembly for cutting flexible sheet material comprising a supporting die block member, said member having means to detachably mount a plurality of individual cutting die units, each of said individual units having upper cutting edges arranged in square shape, said die units being mounted on said member with the corners of their cutting edges in substantially abutting relation and with the units in alternate staggered rank and file relation to each other, said member between the mounted cutting units having a bore in substantial alignment with the cutting axes of the adjoining cutting units to permit passage of cut material therethrough.

7. A cutting die assembly for cutting flexible sheet material comprising a supporting die block member, said member having means to detachably mount a plurality of individual cutting die units, each of said individual units having upper cutting edges arranged in polygonal shape, said die units being mounted on said member with the corners of their cutting edges in substantially abutting relation and with the units in alternate staggered rank and file relation to each other, each of said units having a bore in substantial alignment with its cutting axis to permit passage of cut material therethrough, said member having a plurality of bores, one each in respective substantial alignment with the bore of each of said units to permit passage of cut material therethrough, said member having a bore between each of the mounted cutting units in substantial alignment with the cutting axes of the adjoining cutting units to permit passage of cut material therethrough, the upper edges of the bores between said cutting units of said member being bevelled inwardly.

8. A cutting die assembly for cutting flexible sheet material comprising a supporting die block member, said member having means to detachably mount a plurality of individual cutting die units, each of said individual units having upper cutting edges arranged in polygonal shape, said die units being mounted on said member with the corners of their cutting edges in substantially abutting relation and with the units in alternate staggered rank and file relation to each other, each of said units having a bore in substantial alignment with its cutting axis to permit passage of cut material therethrough, said member having a plurality of bores, one each in respective alignment with the bore of each of said units to permit passage of cut material therethrough, the bores of said cutting units being tapered inwardly from the cutting edges.

9. A cutting die assembly for cutting flexible sheet material comprising a supporting die block member, said member having means to detachably mount a plurality of individual cutting die units, each of said individual units having upper cutting edges arranged in polygonal shape, said die units being mounted on said member with the corners of their cutting edges in substantially abutting relation and with the units in alternate staggered rank and file relation to each other, each of said units having a bore in substantial alignment with its cutting axis to permit passage of cut material therethrough, said member having a plurality of bores, one each in respective substantial alignment with the bore of each of said units to permit passage of cut material therethrough, said member having a bore between each of the mounted cutting units in substantial alignment with the cutting axes of the adjoining cutting units to permit passage of cut material therethrough, the bores of said cutting units being tapered inwardly from the cutting edges and the upper edges of the bores between said cutting units of said member being bevelled inwardly.

10. A cutting die unit comprising an octagonal base portion and upper cutting edges extending therefrom, said cutting edges being arranged in polygonal shape with a plurality of cutting corners, four of the exterior walls of the cutting unit tapering downwardly and outwardly from said cutting edges and the remaining four exterior walls extending vertically.

11. A cutting die unit comprising an octagonal base portion and upper cutting edges extending therefrom, said cutting edges being arranged in polygonal shape with a plurality of cutting corners, half of the exterior walls of the cutting unit tapering downwardly and outwardly from said cutting edges and the other half extending vertically throughout their length, and a bore extending through the unit in alignment with the cutting axis and tapered inwardly from the cutting edges to permit passage of cut material therethrough.

12. A cutting die unit comprising an octagonal base portion and upper cutting edges extending therefrom, said cutting edges being arranged in polygonal shape with a plurality of cutting corners, four of the exterior walls of the cutting unit tapering downwardly and outwardly from said cutting edges and the remaining four walls extending vertically, and a bore extending through the unit in alignment with the cutting axis and tapered inwardly from the cutting edges to permit passage of cut material therethrough, portions of the cutting edges between said corners being arcuately depressed with relation to said cutting corners.

13. A die for cutting meat products and the like comprising a hollow member having a base portion defined by flat exterior peripheral faces, said member terminating in cutting edges on the end of said member opposite to said base portion, each cutting edge lying in a single plane, certain of said faces extending from said base to said cutting edges in an acute angle to said base for at least a portion of their extent, and certain of said faces being intermediate said last-named faces and extending normal to said base.

14. A cutting die unit as set forth in claim 13 further characterized in that said cutting edges have arcuately depressed portions.

References Cited in the file of this patent

UNITED STATES PATENTS

| Number | Name | Date |
|---|---|---|
| 455,015 | Gilliland | June 30, 1891 |
| 684,240 | Hiles | Oct. 8, 1901 |
| 690,512 | Boos | Jan. 7, 1902 |
| 1,112,991 | Dufner | Oct. 6, 1914 |
| 1,188,425 | Elliot | June 27, 1916 |
| 1,260,820 | Scott | Mar. 26, 1918 |
| 1,512,644 | Smith | Oct. 21, 1924 |
| 2,086,435 | Rapp | July 6, 1937 |
| 2,179,616 | Darrow | Nov. 14, 1939 |
| 2,187,651 | Jackson | Jan. 16, 1940 |
| 2,453,599 | Schlegel | Nov. 9, 1948 |
| 2,493,854 | Brainard | Jan. 10, 1950 |
| 2,559,434 | Hyland | July 3, 1951 |

FOREIGN PATENTS

| Number | Country | Date |
|---|---|---|
| 553,709 | France | Feb. 15, 1923 |